United States Patent Office 3,426,861
Patented Feb. 11, 1969

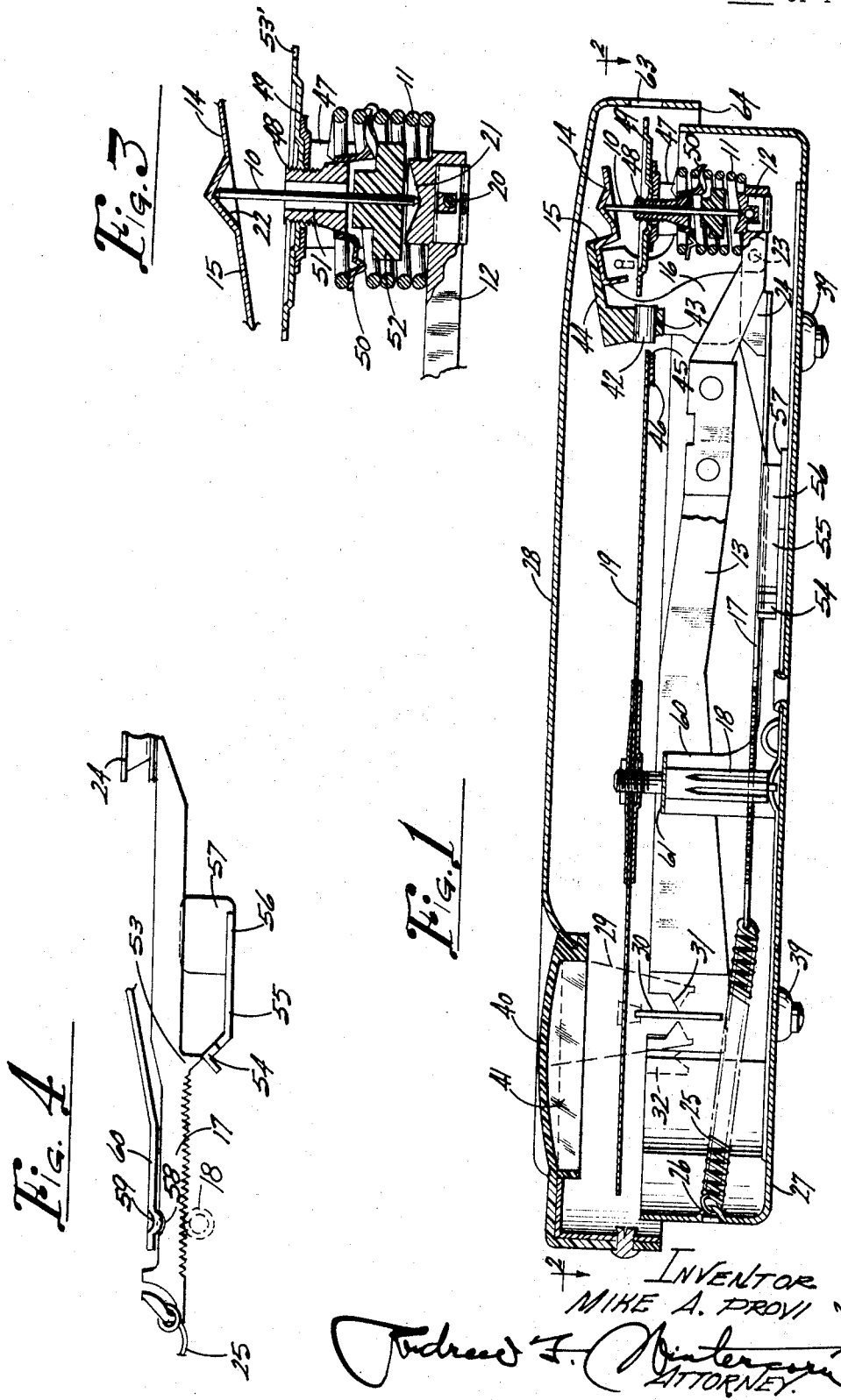

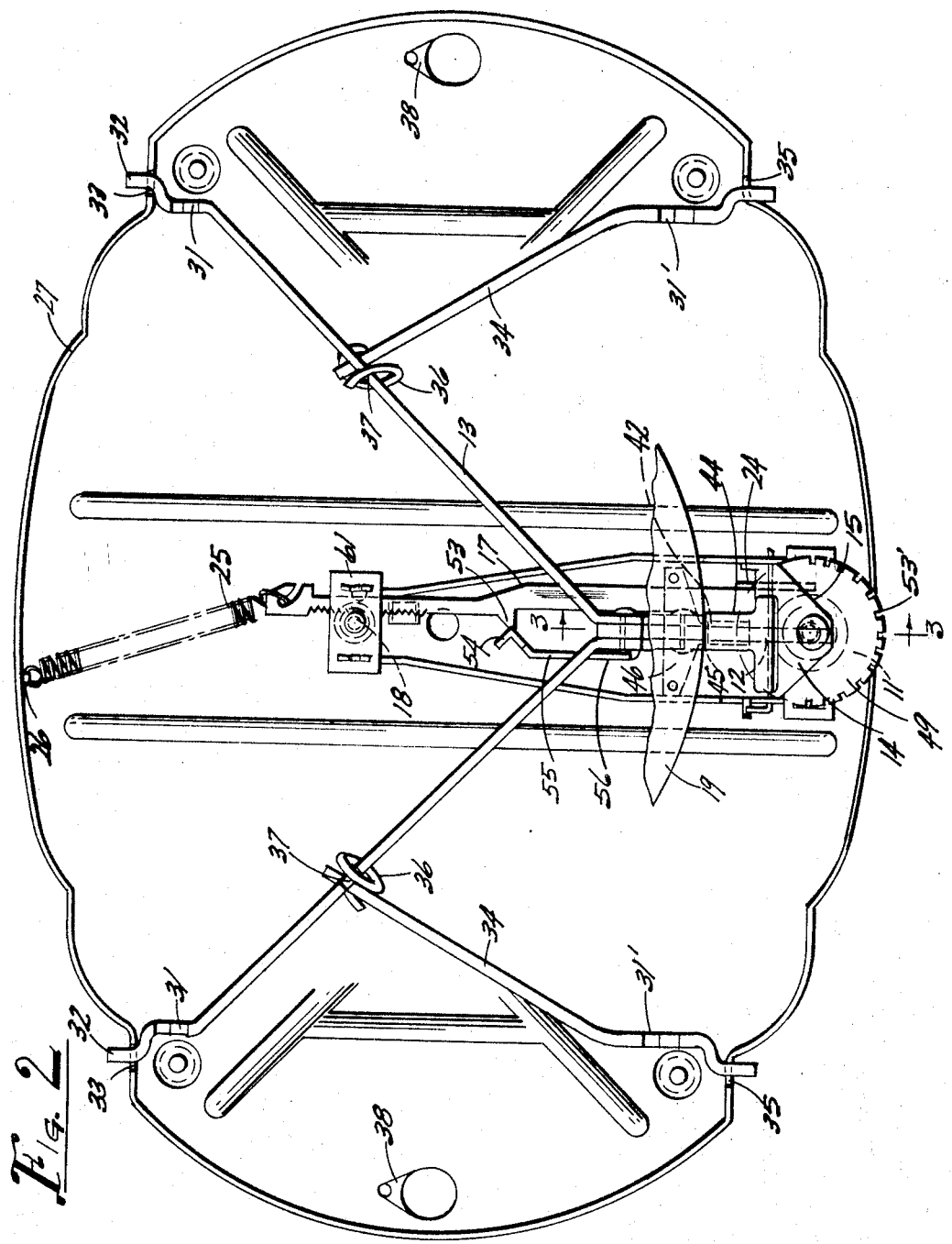

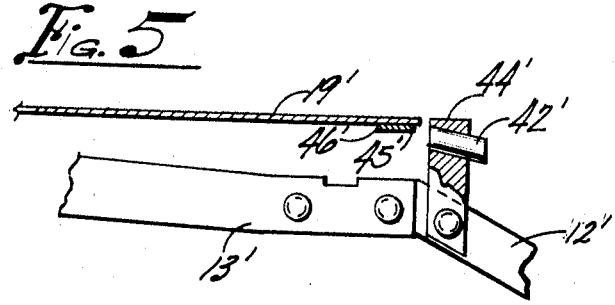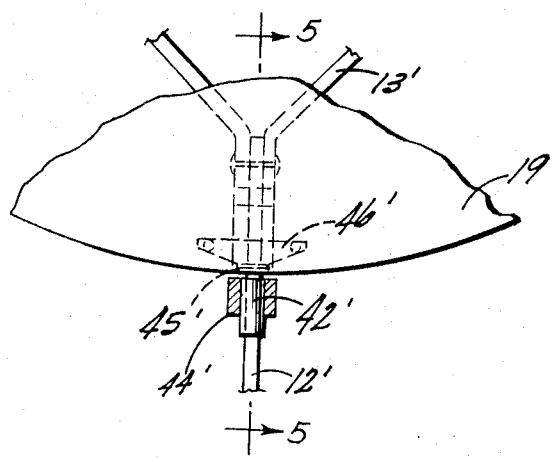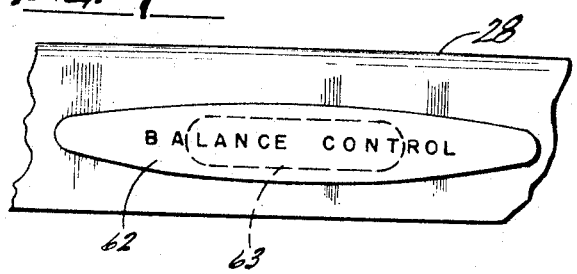

3,426,861
BATHROOM SCALES
Mike A. Provi, Rockford, Ill., assignor to The Brearley Company, Rockford, Ill., a corporation of Illinois
Filed Aug. 30, 1965, Ser. No. 483,724
U.S. Cl. 177—164
Int. Cl. G01g 23/14
18 Claims

ABSTRACT OF THE DISCLOSURE

This bathroom scale combines back-to-zero movement of the dial by magnetic means with a customer operable high-low reading adjustment means, each means being specially designed for operation so as not to interfere with the proper functioning of the other means. Thus, the rack that operates the dial rotating pinion has a projection on the inner or toothed side which engages a V-shaped cam when the scale parts come to rest after a weighing operation to force the rack radially outwardly relative to the pinion, without disconnecting these parts but allowing greater play therebetween, so that the permanent magnet properly located in the scale base relative to a pole portion on a magnetizable plate secured to the underside of the non-magnetic dial at its periphery will be certain of bringing the dial back to zero reading after each weighing operation.

---

This invention relates to improvements in bathroom scales.

It is the principal object of my invention to provide a scale which, whether provided with automatic return-to-zero alone, or high-low adjustment alone, or both combined, can be so adjusted at the plant of the scale manufacturer that the user reading his weight shown on the scale dial knows that it is a dependable reading and will not have a feeling of uncertainty about it by reason of his having made an adjustment designed to be made by the purchaser so as to give a zero reading after each operation of the scale.

The present invention involves improvements on the magnetic return-to-zero disclosed in my Patent 2,949,288, issued Aug. 16, 1960, one phase of the improvements being the complete concealment of the magnetizable element under the peripheral portion of the dial of non-magnetizable material arranged to cooperate with a permanent magnet that is mounted horizontally on one of the spring supported weighing levers fulcrumed on the base, which is the preferred arrangement, or mounted horizontally in a plastic support on the bell-crank lever pivotally connected to one end of the rack that operates the dial and is arranged to be oscillated upon each weighing operation from a zero position through a certain small angularity, the means for securing magnetic return-to-zero being in either case substantially fully concealed and without any objectionable radial projection on the periphery of the dial that could be bent or broken off in the event the purchaser of the scale ever takes it apart and happens to be careless in the handling of the parts in re-assembling it. Further improvements reside in the construction of the magnetizable element carried on and concealed under the dial at the periphery thereof to insure more accurate return-to-zero and also provide sufficient yield in the element circumferentially with respect to the dial so that a prospective purchaser of a scale may, for example, by light hand pressure on the platform cause the scale to go through a cycle of returning to zero automatically, thereby demonstrating the practicability of this feature, should the prospective purchaser have any question about it and want to satisfy himself without actually standing on the scale to see it work.

Another phase of the invention is the high-low adjustment, which may be employed without the magnetic return-to-zero, the manually operable weight adjustment of the present invention being an improvement on that disclosed in Sutton Patent 2,405,619 from the standpoint that the purchaser wishing to make a small change in the indicated weight, if, in his or her opinion, it is high or low in relation, let us say, to the reading of a doctor's scale or perhaps a neighbor's scale, can by merely moving a manually operable element an accurately measured amount obtain the desired small change in indicated weight on the scale. This high-low adjustment may be combined in a scale with the aforementioned magnetic return-to-zero, its construction being such that the adjustment does not affect the zero positioning of the dial, as it involves only a slight raising or lowering of the weighing springs suspension by a screw adjustment to change the angle of the rack operating bell-crank lever the equivalent of a pound or two of indicated weight by backing up or advancing a cam follower projection on the rack relative to the high point of a V-shaped cam fixed with respect to the base alongside the dial operating rack, so as to cause outward deflection of the rack relative to the pinion enough to (1) introduce enough float or play between the rack and pinion with the scale at rest to permit the magnetic means to function to return the dial always to zero after a weighing operation, and (2) change the ultimate indicated weight by reason of a temporary change in gear ratio between the rack and pinion due to the increase in the amount of float or play introduced in the operation of the rack on the pinion at the commencement of a weighing operation.

The invention is illustrated in the accompanying drawings, in which:

FIG. 1 is a longitudinal section through a bathroom scale embodying the improvements of my invention;

FIG. 2 is a plan view of the scale with the platform removed, corresponding to a view on the line 2—2 of FIG. 1, with the dial broken away, however, so as to disclose the rack and pinion for operating the dial and also the cam fixed on the base, relative to which a follower projection provided on the rack is movable longitudinally in accordance with the manual adjustment to increase or decrease the indicated weight, without interfering with the magnetic return to zero after each weighing operation, the permanent magnet shown in full lines in FIG. 1 being shown here in dotted lines in operative relationship to the magnetizable element shown in dotted lines and fixed to the under side of the dial at the periphery thereof, just enough of the dial being indicated to enable showing this element;

FIG. 3 is a section on the line 3—3 of FIG. 2 showing both the permanent weight adjustment and the manually operable weight adjustment;

FIG. 4 is a plan view of the rack and cam, shown full size, with the spring attached to the outer end of the rack normally biasing it into engagement with the rack, and also showing the vertical guide on the dial support which normally maintains the rack in its proper operating relationship to the pinion except with the scale at rest when the notch on the back of the rack is disposed in a position adjacent the bead on the guide, allowing the rack to be deflected by the cam outwardly relative to the pinion to enable the plus or minus weight change in indicated weight;

FIG. 5 is similar to a portion of FIG. 1, being, however, a fragmentary sectional view on the line 5—5 of FIG. 6, showing the permanent magnet mounted substantially horizontally on the weighing lever below the magnetizable element on the dial for effecting the return to zero, this being my preferred arrangement;

FIG. 6 is a fragmentary plan view of FIG. 5 corresponding to a portion of FIG. 2 but showing this preferred arrangement of the permanent magnet and magnetizable element;

Figure 8:
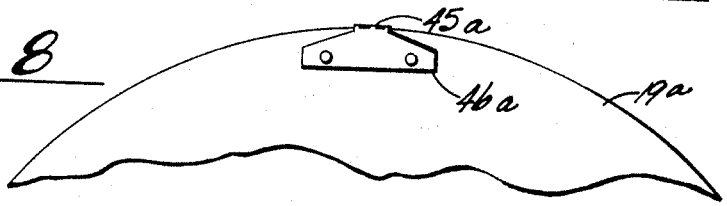
Figure 8A:
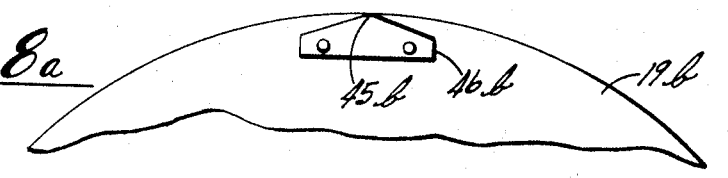
Figure 8B:
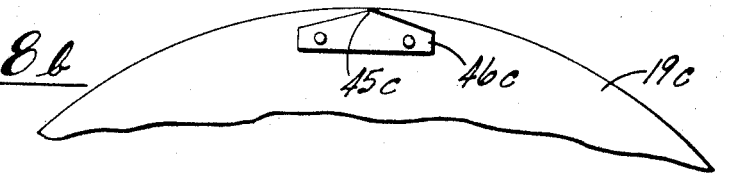
Figure 8C:
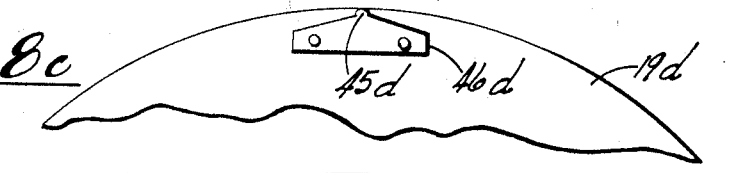
Figure 8D:
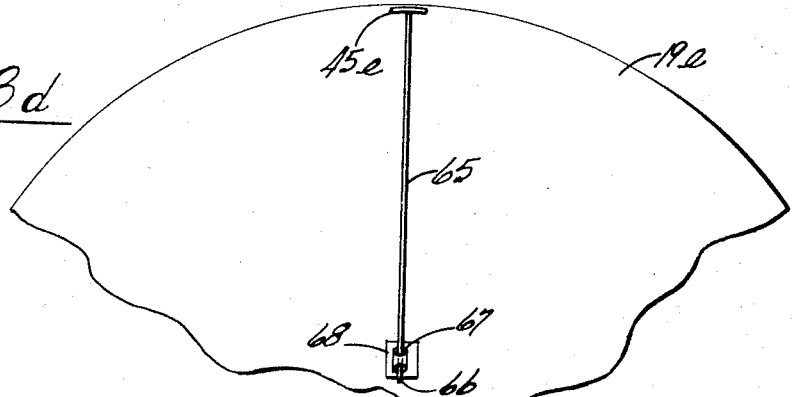
Figure 8E:
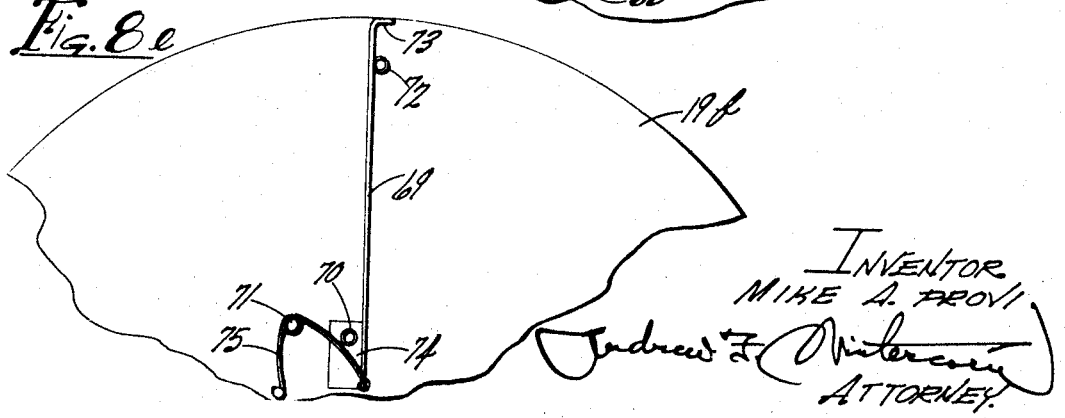

FIG. 7 is a face view of a removable cover plate provided on the back of the scale platform closing a slot through which access may be had to the hand-nut to be adjusted one way or the other for change of indicated weight, and FIGS. 8 to 8e are fragmentary under-side views of dials showing, in FIGS. 8 to 8c variations in the form of the fixed magnetizable element on the under side of the dial at the periphery thereof, all of which have been tested and found to operate satisfactory, while FIGS. 8d and 8e show yieldable magnetizable elements, which, although serving by cooperation with the permanent magnet to return the dial accurately to zero after each operation of the scale, do not set up any noticeable interference with manual manipulation of the scale platform for a demonstration of the return-to-zero function.

Similar reference numerals are applied to corresponding parts throughout the views.

The scale construction disclosed is along the lines of my Patent 3,022,845, issued Feb. 17, 1962, the salient feature of which was the provision of the follower pin 10 movable on the center line of the coiled tension spring 11, whereon the lever system of the scale is suspended, as indicated at 12, the pin accurately registering the exact amount of extension of the weighing spring under all operating conditions and transmitting a corresponding amount of movement to the weight indicating dial 19 so as to give an accurate reading. With this construction, inasmuch as the arcuate movement of the outer end 12 of the main lever 13 is translated through the pin in the center of the spring into a corresponding arcuate movement of one arm 14 of a bell-crank lever 15, the other arm 16 of which, in the arcuate movement of its free end, translates the movement into linear movement of the rack 17 operating the pinion 18 connected to and turning the weight indicating dial 19, it follows that the well-known "arc losses" (as known to the trade) are substantially entirely eliminated, to the extent that error in weight indications is practically negligible. In order to give even more accurate readings directly correlated with the linear extension of the weighing spring, the operating connections are designed to avoid introduction of errors due to slippage, all connections involving true fulcrum action, or as close to that as practicable. In that connection, the follower pin 10 in the center of the spring operating the weight indicating means has movement transmitted thereto positively close to the point where the spring is connected with the platform supporting lever 13, as seen at 20 in FIG. 3, the fulcrum being defined by the pointed lower end on the pin 10 engaging in the apex of a conical shaped recess 21 on the end 12 of lever 13 immediately above the connection 20, the upper end of the pin 10 being also pointed and engaged in a similar conical recess 22 defined on the arm 14 of lever 15. The arm 16 of lever 15 is pivotally connected at its lower end, as at 23, to a vertical lug 24 provided on the rear end of the rack 17, and a long light coiled tension spring 25, attached at one end to the front end of the rack and at its other end to a lug 26 provided on the front wall of the base 27, is disposed at an acute angle to the rack to keep it normally biased toward the pinion 18, while at the same time exerting enough pull on the rack to operate the dial 19 whenever the rack is free to move, as when the main lever 13 is depressed in a weighing operation, the bell-crank lever 15 previously mentioned being then allowed to oscillate from its zero position through an angle the size of which is proportionate to the amount of extension of spring 11 and downward deflection of the main lever 13, so as to cause rotation of the dial 19 through a proportionate angularity and accordingly indicate accurately the weight of the person standing on the platform 28 of the scale. The platform 28 has the usual four downwardly extending legs 29 supported on knife-edged hangers 30, two of which are carried on the two arms of the lever 13 in V-notches 31 near the front ends 32 that are fulcrumed in notches 33 provided in the upper edges of the front wall of the base 27, thereby supporting the front end of the platform 28. The rear end of the platform is similarly supported on two other hangers that engage in V-notches 31' provided in auxiliary levers 34 which are fulcrumed at their rear ends in notches 35 provided in the rear wall of the base 27, the levers 34 having their front ends suspended on the two arms of the lever 13 on hangers 36 that engage in notches 37 provided in the arms of the lever 13. The usual pair of coiled tension springs is provided in opposite sides of the scale stretched between the base 27 and platform 28 at 38 to hold the platform down in contact with all four hangers 30, so that the scale can be picked up and carried about without any danger of disruption of the assembly. Feet 39 at the four corners of the base 27 rest on the floor to support the scale in elevated relation thereto. The usual lens 40 provided in an opening in the front end of the platform 28 has a hair-line panel 41 extending diametrically thereof on the longitudinal center line of the platform 28 and radially with respect to the dial 19 and normally disposed in the same vertical plane with the zero reading on the dial when the scale is at rest, my invention being concerned especially with the magnetic return to zero of the dial after each weighing operation, as previously mentioned, and/or a high-low manual adjustment of indicated weight.

In FIGS. 1 and 2 a permanent magnet 42 of cylindrical form is disclosed as disposed radially with respect to and near the periphery of the dial 19 and mounted substantially horizontally in an opening 43 provided in a substantially vertical arm of a generally L-shaped plastic bracket 44 that is suitably secured by means of its other arm on top of the bell-crank lever 15, whereby to move substantially radially away from the dial in a weighing operation and substantially radially back toward the dial after completion of the operation, and be close enough, therefore, to attract the radial lug 45 of a magnetizable steel plate 46 that is riveted or otherwise suitably secured to the underside of the non-magnetizable dial 19 at its periphery. The bracket 44, being of non-magnetizable material, shields the permanent magnet 42 from the rest of the nearby structure. An even better, and therefore preferred, arrangement is to have the permanent magnet 42' mounted, as in FIGS. 5 and 6, substantially horizontally on a non-magnetic vertical projection 44' provided on the main lever 13' close enough to the periphery of the dial 19' and the projection 45' on the magnetizable steel plate 46' to give the same results. This arrangement is preferred mainly because it reduces likelihood of the magnet ever scraping on the periphery of the dial.

Referring mainly to FIGS. 2, 3, and 4, the weighing spring 11 is suspended on a bracket 47 by means of a hollow screw 48 and manually adjustable hand-nut or wheel 49 threaded on the upper end of the screw, the nut 49, in the conventional scale, being adjusted one way or the other to raise or lower the weighing spring in order to set the dial of the scale back to zero when and if it gets out of adjustment and requires resetting. A cupped sheet metal washer 50 is swivelled on the lower end of the screw 48 and adjustably connected with the upper end portion of the spring 11 in the usual way, this adjustment being accurately performed at the factory in the original assembling of the scale in the calibration thereof. The follower pin 10 previously referred to extends through an axial bore 51 in the screw 48 and has a plastic cylindrical knob 52 mounted on its lower end portion above the lever 13 to insure keeping the pin in proper axial relationship to the spring and lever in the event the scale is handled roughly or even dropped. In the present scale, there are notches 53' provided in the periphery of the nut 49 in uniformly spaced relation, the spacing being such that an adjustment from one notch to the next represents a change of one pound in indicated weight reading on the dial 19. Hence, turning the nut 49 counter-clock-wise two notches is enough for a two pound increase in indicated weight, and turning it clock-wise two notches is enough for a two pound decrease in indicated weight, without, however, affecting the zero reading on the dial with the scale at rest. This unique result is obtained by virtue of the fact that there is a pointed projection 53 provided on the pinion side of the rack 17, which, when the scale is at rest, is disposed at or near the point or apex of a fixed but yieldable V-shaped cam 54 provided on the base 27 as an integral extension on the end of an elongated flexible arm 55 that in turn is integral with a plastic bracket 56 suitably secured by means of a pad portion 57 to the bottom wall of the base 27. The bracket 56 and arm 55 and cam 54 may be made of spring steel. A notch 58 is provided in the rear edge of the rack 17 which, when the scale is at rest, is disposed in register with a rounded vertical guide rib 59 provided on the adjacent leg 60 of the vertical dial supporting bracket 61. Hence, the operator can adjust the hand-nut 49 freely for an increase or decrease in the ultimate indicated weight because the rack 17 at rest is not closely confined as it is otherwise between the rib 59 and the pinion 18, and the rack can, therefore, be cammed outwardly away from the pinion 18 to whatever extent is necessary for a given change in indicated weight, four to five pounds plus or minus being possible with the present construction, although usually the adjustment made in a plus or minus direction is only one or two pounds. The closer the rack 17 is disposed relative to the pinion 18, the higher is the gear ratio, and vice versa. In other words, with the present construction, the cam follower projection 53 is at or near the point of the V-cam 54 with the scale at rest, depending upon the adjustment of nut 49, so that the rack 17 is then held away from the pinion 18 to the maximum extent for the lowest gear ratio, without being disconnected therefrom, thereby also allowing appreciable float or play between the rack and pinion, for two purposes:

(1) to allow the magnetic return to zero of the dial 19 regardless of what adjustment may have been made of the nut 49 to increase or decrease the indicated weight in the weighing operation, and (2) to permit making the plus or minus change in indicated weight by a temporary change of gear ratio between the pinion and rack, only during the commencement of a weighting operation, the position of adjustment of projection 53 with rack 17 forwardly or rearwardly relative to the apex of V-cam 54 determining whether it is a plus or minus change in indicated weight, and the amount of such change. The flexibility of the arm 55 is important from the standpoint that there is no danger of any damage being done in shipment or in the event of rough handling of the scale by the user or if someone jumps on the scale; the yield in the arm 55 prevents any damage being done under such conditions.

Referring to FIGS. 8 to 8e:

(1) The magnetizable steel plate 46a shown in FIG. 8 has a short rectangular radial lug 45a similar to the lug 45 on plate 46 in FIG. 2 but projecting slightly from the periphery of the non-magnetizable dial 19a, this lug 45a operating with suitable working clearance with respect to the magnet 42 or 42';

(2) The magnetizable steel plate 46b shown in FIG. 8a has, in lieu of a radial lug, a rounded apex 45b of the triangular outer portion of the plate flush with the periphery of the non-magnetizable dial 19b, the rounded apex portion 45b operating with suitable working clearance with respect to the magnet 42 or 42';

(3) The magnetizable steel plate 46c shown in FIG. 8b has the apex 45c of the triangular outer portion of the plate substantially flush with the periphery of the non-magnetizable dial 19c, this apex 45c operating with suitable working clearance with respect to the magnet 42 or 42';

(4) The magnetizable steel plate 46d in FIG. 8c has a rounded projection 45d substantially flush with the periphery of the non-magnetizable dial 19d, this projection 45d operating with suitable working clearance with respect to the magnet 42 or 42';

(5) A steel spring wire 65 is shown in FIG. 8d as having an integral magnetizable T-shaped outer end portion 45e which may or may not be struck on the same radius as the periphery of the non-magnetizable dial 19e but at any rate is disposed substantially flush with said periphery to operate with suitable working clearance with respect to the magnet 42 or 42' the inner end portion 66 of the spring wire 65 being suitably secured to the dial 19e, as by insertion through registering holes 67 in a downwardly embossed portion 68 of the dial, the wire 65 being deflectable at its outer end 45e to the right or left from the radial position shown when a person applies light pressure to the scale platform with the hand or foot merely to cause the dial to turn through a small angularity and then return to zero, the yield in the spring 65 substantially eliminating the otherwise noticeable interference with manual manipulation of the scale platform for demonstration of the return-to-zero function, and (6) The radial steel arm 69 shown in FIG. 8e is relatively rigid and is pivoted as at 70 on the under side of the non-magnetizable dial 19f and held by a torsion-type tension spring 71 normally in engagement at its outer end with a stop pin 72 provided on the dial, so that the magnetizable integral right angle outer end portion 73 is disposed substantially flush with the periphery of the dial to operate with suitable working clearance with respect to the magnet 42 or 42', the arm 69 being deflectable away from the stop 72 when light pressure is applied to the platform of the scale with the hand or foot so that the magnetic return-to-zero does not set up any otherwise noticeable interference with the manual manipulation of the scale for demonstration of the return-to-zero function, the arm 74 of spring 71 attached to the inner end of arm 69 being in this operation pulled away from the other arm 75 fixed to the dial to build up additional tension in the spring 71 to snap the arm 69 back against the stop pin 72 as soon as the outer end 73 is no longer attracted by the magnet.

In operation, an arcuate cover plate 62, which is suitably detachably secured in place in the slot 63 provided in the downturned flange 64 on the platform 28 behind the hand-nut 49, is removed whenever a change in indicated weight is considered necessary. Instructions for the high-low manual adjustment are printed on a paper glued to the inside of the plate 62, and the words "Balance Control" appear on the outside, as seen in FIG. 7. The slot 63 affords easy access to the nut 49, and the operator, following the instructions given on the cover plate, will turn the nut to the left (or clockwise) for a lower indicated weight or to the right (or counterclockwise) for an increase in indicated weight, these adjustments being always well within a range that will not interfere with the proper functioning of the magnetic return to zero. The notches 53' being spaced for the equivalent of one pound changes, it is a simple matter to get the desired results. The improved magnetic return to zero herein disclosed may be provided without the high-low adjustment and, in addition to being better than earlier constructions from the standpoint of concealment of the parts required which makes for generally improved appearance of the scale, the present construction gives better performance and greater certainty of an exact zero reading every time. Also, when the yieldable constructions of FIGS. 8d and 8e are used, there is the advantage that the return to zero function may be checked more readily with only light hand or foot pressure applied to the platform, whereas with other mechanical return to zero constructions rather heavy pressure is required and it is, therefore, not so easy to demonstrate this function to a prospective purchaser.

I claim:

1. A weighing scale comprising a base, a platform, a lever mechanism for movably supporting said platform on said base, weighing spring means restraining movement of the lever mechanism, and weight indicating means operable upon movement of the lever mechanism including a rack and pinion, the pinion turning a weight indicator, and the rack being operable in response to movement of the lever mechanism to operate the weight indicator in proportion to the weight applied to the platform, the improvement which consists in the provision of a single magnetizable element movable with the weight indicating means in the operation thereof providing a single effective magnetic pole, a magnet independent of the weighing mechanism supported in a predetermined relationship to said base adjacent the path of movement of said magnetizable element and arranged to exert a pull laterally on said single magnetic pole upon return of the weight indicating means approximately to zero position so as to cause zero positioning thereof, and an indicated weight adjustment comprising manually adjustable means for adjusting the gear ratio of the rack to the pinion by moving the rack radially outwardly relative to the pinion for variable increased play therebetween during a predetermined range of the first portion of the rack's movement in a weighing operation, the play being sufficient in relation to the pull of the magnet to allow this adjustment for higher or lower indicated weight without altering the zero positioning of the weight indicating means by said magnetic means.

2. A weighing scale as set forth in claim 1 wherein the manually adjustable means includes a manually rotatable nut wheel threadedly adjustable with respect to a vertical screw on which the weighing spring means is suspended, the nut wheel having circumferentially spaced graduations on the periphery thereof spaced in terms of pounds of indicated weight change, so that in turning said nut in one direction the number of pounds higher reading is determinable by the graduations, and vice versa for a lower reading.

3. A weighing scale comprising a base, a platform, a lever mechanism for movably supporting said platform on said base, weighing spring means restraining movement of the lever mechanism, and weight indicating means operable upon movement of the lever mechanism including a rack and pinion, the pinion turning a weight indicator, and the rack being operable in response to movement of the lever mechanism to operate the weight indicator in proportion to the weight applied to the platform, the improvement which consists in the provision of an indicated weight adjustment comprising manually adjustable means for adjusting the gear ratio of the rack to the pinion by moving the rack radially outwardly relative to the pinion for variable increased play therebetween during a predetermined range of the first portion of the rack's movement in a weighing operation.

4. A weighing scale as set forth in claim 3 wherein the manually adjustable means includes a manually rotatable nut wheel threadedly adjustable with respect to a vertical screw on which the weighing spring means is suspended, the nut wheel having circumferentially spaced graduations on the periphery thereof spaced in terms of pounds of indicated weight change, so that in turning said nut in one direction the number of pounds higher reading is determinable by the graduations, and vice versa for a lower reading.

5. A weighing scale as set forth in claim 3 wherein the manually adjustable means includes a fixedly supported manually rotable nut threadedly adjustable with respect to a verticle screw on which the weighing spring means is suspended, the weight indicating means including a bell-crank lever pivotally mounted on a fixed support having two arms, one arm thereof movable in response to extension of said spring in weighing and also in response to adjustment of said nut, the other arm pivotally connected to and moving said rack, there being a stationary V-shaped cam relative to the apex of which said rack moves transversely as it moves endwise in the weighing operation and also in response to adjustment of said nut, and a projection on said rack slidable on said cam to deflect the rack radially outwardly relative to the pinion during the first portion of the rack's movement in a weighing operation.

6. A weighing scale as set forth in claim 5 wherein said rack is guided for reciprocatory movement in a predetermined fixed space relationship to said pinion but the back of said rack is cut away at one place for additional clearance relative to said guide to permit radial displacement of said rack relative to said pinion during the first portion of the rack's movement in a weighing operation.

7. A weighing scale as set forth in claim 5 wherein said cam has a flexible resilient mounting permitting give of said cam transversely relative to said rack to avoid damage to the rack or pinion in the event of violent operation of the scale.

8. A weighing scale comprising a base, a platform, a lever mechanism for movably supporting said platform on said base, weighing spring means restraining movement of the lever mechanism, and a weight indicator dial operable by a rack and pinion in response to movement of the lever mechanism in proportion to the amount of weight applied to the platform, the improvement which consists in the provision on the under side of and concealed within the radius of said dial and disposed radially with respect thereto of a single magnetizable element providing a single effective magnetic pole on its outer end, and a magnet of elongated form providing at its one end the opposite magnetic pole for attraction of the aforesaid magnetic pole and mounted on said lever mechanism substantially horizontally in the plane of said magnetizable element and radially with respect to said dial.

9. A weighing scale comprising a base, a platform, a lever mechanism for movably supporting said platform on said base, weighing spring means restraining movement of the lever mechanism, a bell-crank lever pivoted relative to the base on horizontal axis and having two arms, one of which moves vertically with the weighing spring means in a weighing operation, and the other of which moves horizontally, and a weight indicator dial operable by a vertical pinion which is operable by a horizontally movable rack in response to movement of the lever mechanism in proportion to the amount of weight applied to the platform, the rack being pivotally connected to the horizontally movable arm of said bell-crank lever, the improvement which consists in the provision on the under side of and concealed within the radius of said dial and disposed radially with respect thereto of a single magnetizable element providing a single effective magnetic pole on its outer end, and a magnet of elongated form providing at its one end the opposite magnetic pole for attraction of the aforesaid magnetic pole and mounted on said horizontally movable arm of said bell-crank lever substantially horizontally in the plane of said magnetizable element and radially with respect to said dial.

10. A weighing scale comprising a base, a platform, a lever mechanism for movably supporting said platform on said base, weighing spring means restraining movement of the lever mechanism, and a weight indicator dial operable by a rack and pinion in response to movement of the lever mechanism in proportion to the amount of weight applied to the platform, the improvement which consists in the provision on the under side of and concealed within the radius of said dial and disposed radially with respect thereto of a single magnetizable element providing a single effective magnetic pole on its outer end, and a magnet of elongated form providing at its one end the opposite magnetic pole for attraction of the aforesaid magnetic pole and mounted for movement toward and away from the periphery of said dial in the movement of said lever mechanism in a weighing operation and so as to be horizontally disposed in the plane of said magnetizable element radially with respect to said dial when said lever mechanism is at rest without any load on said platform.

11. In a weighing scale comprising a base, a platform, a lever mechanism for movably supporting the platform on the base, weighing spring means restraining movement of the lever mechanism, and weight indicating means operable upon movement of the lever mechanism, including a rack and pinion, the pinion turning a weight indicator whose angular movement is proportionate to the weight impose don the platform, the rack being operable endwise in response to movement of the lever mechanism in proportion to the weight imposed on the platform, the improvement which consists in the provision of an indicated weight adjustment manually operable externally of the scale while the base is resting on a support to change the radially spaced relationship between the rack and pinion and accordingly the gear ratio therebetween to so affect the turning of the pinion by the rack as to cause increase in indicated weight when said adjustment is operated in one direction, and vice versa when the adjustment is operated in the opposite direction.

12. In a weighing scale comprising a base, a platform, weighing mechanism to turn from a zero position through an angle proportionate to the weight to be indicated, the improvement which consists of a single magnetizable element disposed radially relative to and movable with the dial in the rotation thereof providing a single effective magnetic pole, and a single magnet disposed radially relative to said dial adjacent the path of movement of said magnetizable element to exert an effective pull laterally on said single magnetic pole upon return of said dial approximately to zero positioning thereof, said dial being of non-magnetizable material, said magnetizable element being in the form of a generally rectangular magnetizable plate of appreciable dimension radially of the dial and of greater dimension transversely thereof secured to the underside of said dial near the periphery thereof but tapered on the radially outer side toward the periphery of said dial in a generally triangular portion to define the single effective pole at the apex of the triangle.

13. A weighing scale as set forth in claim 12 wherein the apex of the generally triangular portion has a short rectangular lug thereon of approximately the same width as the magnet disposed at the periphery of the dial with its outer end in a predetermined spaced parallel relation to the magnet.

14. A weighing scale as set forth in claim 12 wherein the apex of the generally triangular portion has a short lug thereon of less width than the magnet disposed with its outer end at the periphery of the dial in a predetermined spaced relation to the magnet.

15. A weighing scale as set forth in claim 12 wherein the apex of the generally triangular portion is substantially flush with the periphery of the dial and in a predetermined spaced relation to the magnet.

16. In a weighing scale comprising a base, a platform, weighing mechanism yieldably supporting said platform on said base, and weight indicating means including a dial operatively connected with said weighing mechanism to turn from a zero position through an angle proportionate to the weight to be indicated, the improvement which consists of a single magnetizable element disposed radially relative to and movable with the dial in the rotation thereof providing a single effective magnetic pole, and a single magnet disposed radially relative to said dial adjacent the path of movement of said magnetizable element to exert an effective pull laterally on said single magnetic pole upon return of said dial approximately to zero position so as to cause zero positioning thereof, said dial being of non-magnetizable material, said magnetizable element being in the form of a spring-centered part movable relative to the dial and yieldable laterally circumferentially of the peripheral portion of the dial from a zero position so as to reduce the otherwise noticeable resistance to manual manipulation of the scale platform for demonstration of the return to zero function.

17. A weighing scale as set forth in claim 16 wherein the magnetizable element is a spring wire disposed radially of and fixed at its inner end to the dial, the outer end having in rigid relation thereto an enlarged magnetizable pole portion at the periphery of the dial in a predetermined spaced relation to the magnet.

18. A weighing scale as set forth in claim 16 wherein the magnetizable element is an arm disposed radially of and pivoted at its inner end on the dial, the outer end having in rigid relation thereto an enlarged magnetizable pole portion at the periphery of the dial in a predetermined spaced relation to the magnet, a stop on the dial limiting oscillatory movement of the arm in one direction with the arm radially disposed relative to the dial, and spring means yieldably resisting deflection of the arm away from said stop and returning it to engagement with said stop.

References Cited
UNITED STATES PATENTS

| | | | |
|---|---|---|---|
| 1,447,307 | 3/1923 | Hopkinson | 177—74 |
| 2,668,045 | 2/1954 | Provenzano | 177—257 |
| 2,960,329 | 11/1960 | Hanssen | 177—168 XR |
| 3,193,034 | 7/1965 | Hutchison et al. | 177—256 |

ROBERT S. WARD, JR., *Primary Examiner.*

L. HAMBLEN, *Assistant Examiner.*

U.S. Cl. X.R.

177—168, 174